United States Patent
Pei

(10) Patent No.: US 12,457,253 B2
(45) Date of Patent: Oct. 28, 2025

(54) CALL PROCESSING METHOD AND APPARATUS, STORAGE MEDIUM, AND ELECTRONIC

(71) Applicant: Beijing Xiaomi Mobile Software Co., Ltd., Beijing (CN)

(72) Inventor: Shilong Pei, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 399 days.

(21) Appl. No.: 18/068,321

(22) Filed: Dec. 19, 2022

(65) Prior Publication Data
US 2024/0106869 A1    Mar. 28, 2024

(30) Foreign Application Priority Data
Sep. 23, 2022    (CN) .......................... 202211178094.2

(51) Int. Cl.
*H04L 65/1069* (2022.01)
*H04M 3/428* (2006.01)
*H04M 7/00* (2006.01)

(52) U.S. Cl.
CPC ........ *H04L 65/1069* (2013.01); *H04M 3/428* (2013.01); *H04M 7/006* (2013.01)

(58) Field of Classification Search
CPC .... H04L 65/1069; H04M 3/428; H04M 7/006
USPC .......................................................... 370/259
See application file for complete search history.

(56) References Cited

U.S. PATENT DOCUMENTS

| 2006/0067513 | A1 | 3/2006 | Maytal et al. | |
| 2013/0156177 | A1* | 6/2013 | Theivendran | H04M 3/428 379/215.01 |
| 2016/0227025 | A1* | 8/2016 | Soby | H04M 19/042 |

FOREIGN PATENT DOCUMENTS

| EP | 1473914 A2 | 11/2004 |
| WO | 2018196548 A1 | 11/2018 |

* cited by examiner

*Primary Examiner* — Ahmad F. Matar
*Assistant Examiner* — Jirapon Tulop
(74) *Attorney, Agent, or Firm* — McCoy Russell LLP

(57) ABSTRACT

A call processing method includes: receiving, in response to determining a voice over Internet protocol (VOIP) call needs to be initiated through a first application on a terminal, a call state query request message sent by the first application, where the call state query request message is used to request querying whether the terminal is engaged in a telephone call; and always sending, to the first application, a response message used to indicate that the terminal is not engaged in a telephone call, so that the first application establishes the VOIP call with a first peer device based on the response message.

20 Claims, 19 Drawing Sheets

---

In response to determining a voice over Internet protocol (VOIP) call needs to be initiated through a first application on a terminal, a call state query request message sent by the first application is received ~ 100

↓

Always send, to the first application, a response message used to indicate that the terminal is not engaged in a telephone call, so that the first application establishes the VOIP call with the first peer device based on the response message ~ 102

CALL PROCESSING METHOD AND APPARATUS, STORAGE MEDIUM, AND ELECTRONIC

CROSS REFERENCE TO RELATED APPLICATIONS

The present application claims the benefit of priority to Chinese Application No. 202211178094.2, filed on Sep. 23, 2022, the entire contents of which are incorporated herein by reference in their entireties for all purposes.

BACKGROUND

With the rapid development and advancement of fourth generation (4G), fifth generation (5G), and three-party chat applications, a voice over Internet protocol (VOIP) call has been developed rapidly, and a representative WeChat call has occupied an increasingly important position in people's lives.

SUMMARY

According to a first aspect of the present disclosure, there is provided a call processing method, including:
  receiving, in response to determining a voice over Internet protocol (VOIP) call needs to be initiated through a first application on a terminal, a call state query request message sent by the first application, wherein the call state query request message is used to request querying whether the terminal is engaged in a telephone call; and
  always sending, to the first application, a response message used to indicate that the terminal is not engaged in a telephone call, so that the first application establishes the VOIP call with a first peer device based on the response message.

According to a second aspect of the present disclosure, there is provided a non-transitory computer-readable storage medium, storing machine-readable instructions thereon, and when the machine-readable instructions are called and executed by a processor, the processor is promoted to implement the call processing method of any one of the embodiments of the present disclosure.

According to a third aspect of the present disclosure, there is provided an electronic device, including:
  a processor; and
  a memory for storing processor executable instruction,
    where the processor is configured to perform the call processing method of any one of the embodiments of the present disclosure.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of this specification, illustrate the embodiments consistent with the present disclosure and, together with the specification, serve to explain the principles of the disclosure.

DETAILED DESCRIPTION

Figure 1:
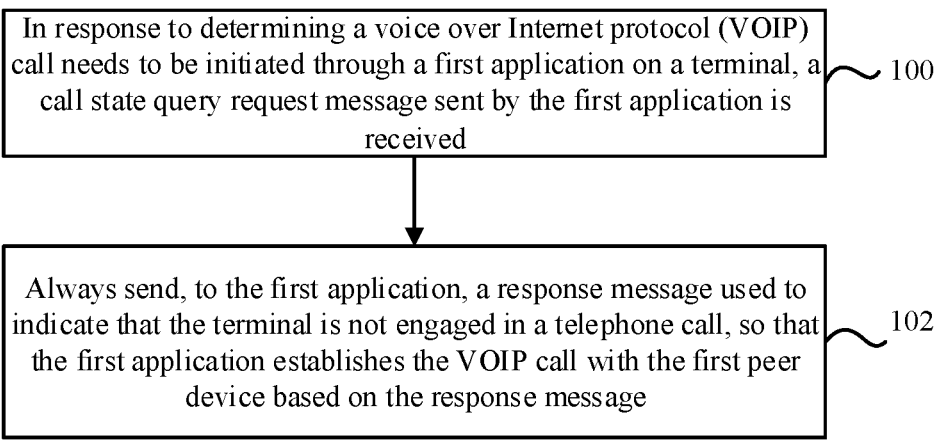
FIG. 1 is a flowchart of a call processing method according to an example of the present disclosure.

Exemplary embodiments will be described in detail here, and examples thereof are shown in the accompanying drawings. When the following descriptions refer to the figures, the same numbers in different figures indicate the same or similar elements, unless otherwise indicated. The implementations described in the following examples do not represent all implementations consistent with the present disclosure. Instead, they are merely examples of apparatuses and methods consistent with some aspects of the present disclosure described as detailed in the appended claims.

The terms used in the present disclosure are only for the purpose of describing specific examples, and are not intended to limit the present disclosure. The terms "a/an", "said" and "the" in the singular form used in the present disclosure and the appended claims are also intended to include the plural forms, unless otherwise clearly indicated in the context. It should further be understood that the term "and/or" as used here refers to and includes any or all possible combinations of one or more associated listed items.

It should be understood that the terms "first", "second", "third" etc. are used to describe a variety of information, however, these information should not be limited to these terms. These terms are used only to distinguish the same type of information from one another. For example, without departing from the scope of the present disclosure, first information may also be referred to as second information, and similarly, the second information may also be referred to as the first information. Depending on the context, the word "if" as used here may be interpreted as "when" or "upon" or "in response to determining".

The technical solutions of the present disclosure relates to the technical field of mobile terminal, and in particular to a call processing method and apparatus, a storage medium, and an electronic device.

With the rapid development and advancement of 4G, 5G, and three-party chat applications, a voice over Internet protocol (VOIP) call has been developed rapidly, and a representative WeChat voice has occupied an increasingly important position in people's daily life. However, at present, all mobile phones in the market do not support coexistence of the WeChat call and the telephone call, that is, after the telephone call is answered, the WeChat call cannot be used.

For example, when a user is using a mobile phone to make a telephone call and further needs to establish a VOIP call through a WeChat on the mobile phone, the WeChat first asks an operation system of the mobile phone whether the mobile phone is currently making the telephone call. After receiving a response message returned by the operation system that the current mobile phone is engaged in a telephone call, the VOIP call may fail to be established. That is, the existing mobile phone cannot establish the VOIP call again when making a telephone call.

When the user is using the WeChat on the mobile phone to make a VOIP call, the user may use the mobile phone to normally establish a telephone call. In an example, the user may use the mobile phone to answer or dial a telephone call normally. At the same time, the operation system of the mobile phone sends a notification message to the WeChat that the user answers or dials a telephone call, so that the WeChat ends the current VOIP call based on the notification message. That is, the existing mobile phone cannot keep the VOIP call in the background when making a telephone call.

In view of this, embodiments of the present application provide a call processing method to implement coexistence of a mobile phone call and a VOIP call.

The call processing method according to an embodiment of the present disclosure will be described below in detail with reference to the accompanying drawings.

FIG. 1 is a flowchart of a call processing method according to an example of the present disclosure. As shown in FIG. 1, the method in this example may be performed by a terminal, including but not limited to a mobile phone, an ipad, a smart watch, and the like. The method in this example may be executed by an operation system of the terminal, where the operation system includes, but is not limited to, an android system, an IOS system, and the like. As shown in FIG. 1, the method in this example may include the following steps:

In step 100, in response to determining a voice over Internet protocol (VOIP) call needs to be initiated through a first application on a terminal, a call state query request message sent by the first application is received.

The first application is an application having a function of establishing a VOIP call. For example, the first application may be a WeChat application, a QQ application, and the like. The present disclosure is not limited thereto. For ease of description, the following embodiments are described by using the first application as a WeChat application.

The VOIP is a voice call technology, which may establish a voice call and a multimedia conference via an Internet protocol, that is, communicate via the Internet.

The call state query request message is used to request querying whether the terminal is engaged in a telephone call. For example, the operation system of the terminal may call a system interface to monitor whether the current terminal is engaged in a telephone call. Therefore, when a VOIP call needs to be established by using a Wechat application on the terminal, an operation system of the terminal may receive a call state query request message sent by the WeChat application and used to query whether the terminal is engaged in a telephone call.

In step 102, a response message used to indicate that the terminal is not engaged in a telephone call is always sent to the first application, so that the first application establishes the VOIP call with the first peer device based on the response message.

The first peer device is a device that intends to establish the VOIP call with the terminal. For example, the first peer device may be a device such as mobile phone, an ipad, and a smart watch of a user intending to establish a VOIP call with the terminal user.

In order to enable a WeChat application on the terminal to successfully establish a VOIP call, in the call processing method in this example, in response to determining an operation system of the terminal receives the call state query request message, no matter whether the operation system of the current terminal monitors that the terminal is engaged in a telephone call, a response message that the current terminal is not engaged in a telephone call is returned to the WeChat application.

In response to receiving the response message that the terminal is not engaged in a telephone call, the WeChat application may establish the VOIP call with the first peer device.

According to the call processing method provided in the embodiment of the present disclosure, in response to determining a voice over Internet protocol (VOIP) call needs to be initiated through a first application on a terminal, a call state query request message sent by the first application is received. where the call state query request message is used to request querying whether the terminal is engaged in a telephone call, always sending, to the first application, a response message used to indicate that the terminal is not engaged in a telephone call, so that the first application establishes the VOIP call with a first peer device based on the response message. According to the call processing method provided in the embodiment of the present disclosure, after a call is answered, a VOIP call may be normally answered or dialed, so that coexistence of the telephone call and the VOIP call is implemented.

The call processing method is further described below.

In an optional example, after the VOIP call is established, in response to determining it is monitored that a telephone call exists on the terminal simultaneously, an audio signal of the VOIP call is played, and mute processing is performed on the audio signal of the telephone call.

Corresponding to the foregoing embodiments, when a VOIP call is established again in the case where the terminal is engaged in a telephone call, that is, after the VOIP call is established, it can be monitored that the telephone call exists on the terminal simultaneously. At this time, the operation system of the terminal may set the audio signal of the VOIP call to be in a playing state, and set the audio signal of the telephone call to be in a mute state.

In an optional example, when a terminal user dials a VOIP call while making a telephone call, or when the terminal user answers the VOIP call in the case of making a telephone call, the state of the telephone call may be automatically set to be a hold state by an operation system of the terminal, and notify the hold state to a peer user, so that the peer user knows that the terminal user is in a busy state currently, and reminds the peer user to wait for a while, thereby bringing better usage experience to the user.

The call processing method of the example may automatically set an audio signal of a VOIP call to be in a playing state and set the audio signal of the telephone call to be in a mute state after a user establishes the VOIP call again in the case of making a telephone call, without requiring the user to manually reallocate an audio resource, and having a relatively high degree of intelligence.

Figure 2:
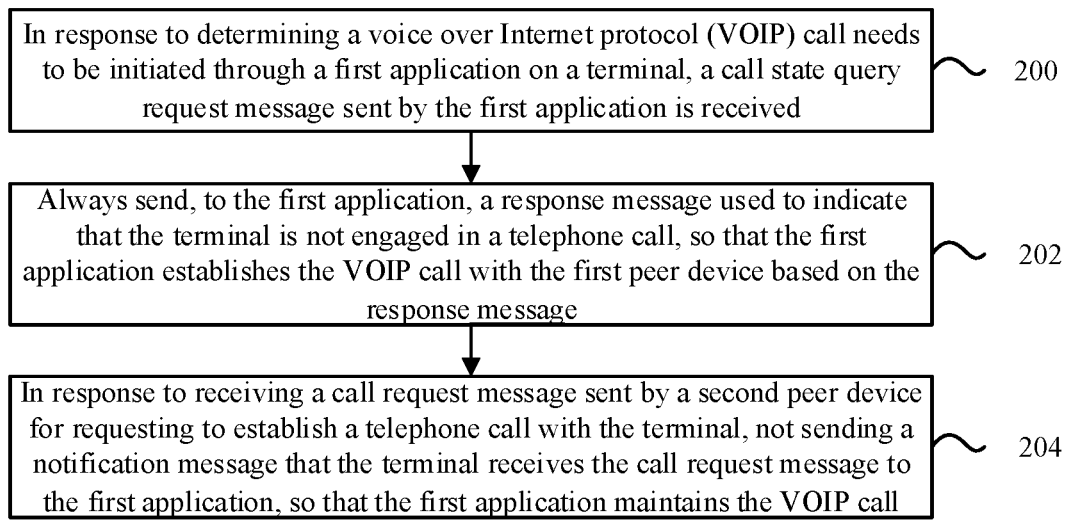
FIG. 2 is a flowchart of another call processing method according to an example of the present disclosure.

FIG. 2 is a flowchart of another call processing method according to an example of the present disclosure. In the description of this embodiment, the same steps as those in any one of the foregoing embodiments will be described briefly, and will not be described in detail. For details, reference may be made to any one of the foregoing embodiments. This embodiment further describes, on the basis of the foregoing embodiment, processing performed by the call processing method of the present disclosure when a request for establishing a telephone call is received before the VOIP call ends. As shown in FIG. 2, the method in this example may include the following steps:

In step 200, in response to determining a voice over Internet protocol (VOIP) call needs to be initiated through a first application on a terminal, a call state query request message sent by the first application is received.

where the call state query request message is used to request querying whether the terminal is engaged in a telephone call.

In step 202, a response message used to indicate that the terminal is not engaged in a telephone call is always sent to the first application, so that the first application establishes the VOIP call with the first peer device based on the response message.

In step 204, in response to receiving a call request message sent by a second peer device for requesting to establish a telephone call with the terminal, not sending a notification message that the terminal receives the call request message to the first application, so that the first application maintains the VOIP call.

The second peer device may be a mobile phone, an ipad, a smart watch, etc.

Figure 3:
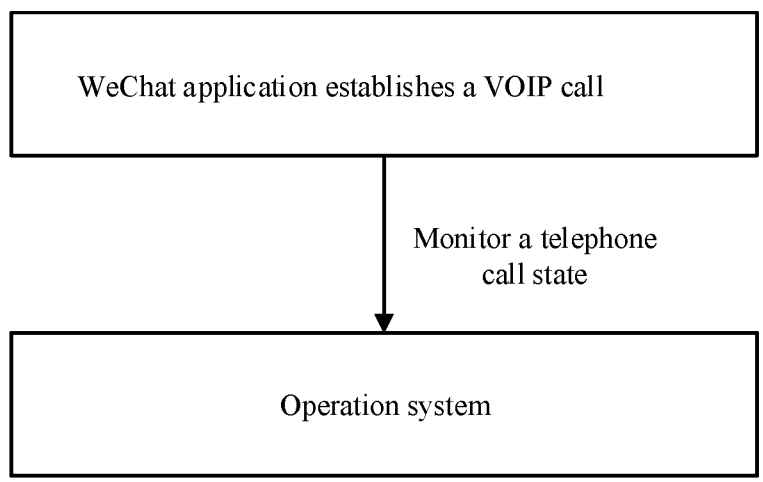
FIG. 3 is a schematic diagram of a WeChat application monitoring a telephone call state according to an example of the present disclosure.

As shown in FIG. 3, the WeChat application on the terminal starts to monitor the telephone call state of the terminal after establishing the VOIP call. The telephone call state includes: receiving a telephone call, dialing a telephone call, ending a telephone call, etc. In an existing implementation, after an operation system of a terminal monitors that a call state of the terminal changes, the changed call state is sent to an application monitoring the telephone call state. For example, the changed call state may be sent to a WeChat application.

According to the call processing method in the embodiments of the present disclosure, after a VOIP call is established by the WeChat application on the terminal, sending any notification message about a telephone call state to the WeChat application is stopped, thereby avoiding the problem in the prior art that in response to determining the terminal receives a call request message initiated by the second peer device for establishing a telephone call, a notification message of the terminal receiving the call request message is sent to the WeChat application, so that the WeChat application terminates a current VOIP call.

According to the call processing method provided in the embodiments of the present disclosure, after a first application establishes a VOIP call and after a telephone call request sent by other devices is received, a notification message is not sent to the first application, so that after a terminal user answers the telephone call, the VOIP call may be kept in a terminal background, and coexistence of the VOIP call and the telephone call is implemented.

In an optional example, a filter may be additionally set between an application layer (including applications such as a WeChat application and a QQ application, and this example taking the WeChat application as an example) and an application framework layer of an operation system. The filter is configured to selectively notify WeChat based on a specific usage scenario, so as to implement a purpose of coexistence of a VOIP call and a telephone call.

With reference to the foregoing embodiments, when a VOIP call needs to be established through a Wechat application on a terminal, an operation system may receive a call state query request message sent by the WeChat application. At this time, it may be determined whether a function allowing coexistence of a telephone call and a VOIP call is enabled. In response to determining that the function is enabled, no matter whether the operation system of the current terminal monitors that the terminal is engaged in a telephone call, a response message that the current terminal is not engaged in a telephone call is returned to the WeChat application through the filter. Thus, the WeChat application establishes a VOIP call based on the response message, to implement the purpose of coexistence of a telephone call and a VOIP call.

Figure 4:
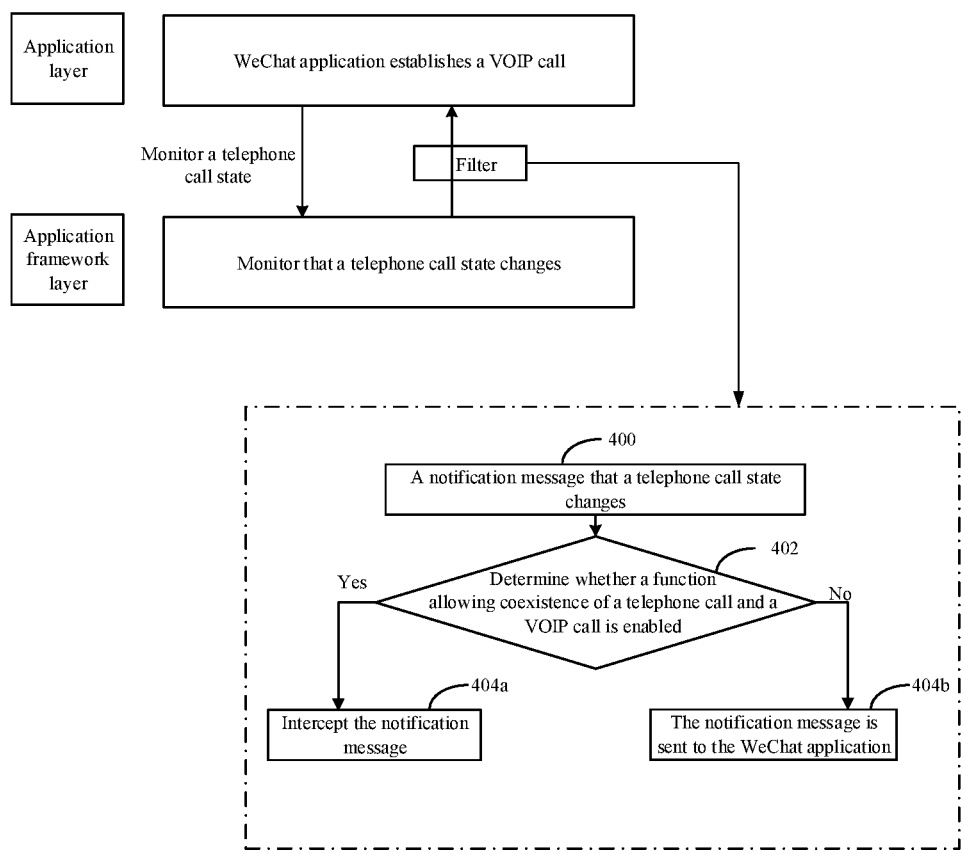
FIG. 4 is a flowchart of another call processing method according to an example of the present disclosure.

The WeChat application starts to monitor the telephone call state of the terminal after establishing the VOIP call. When the operation system monitors that a telephone call state of the terminal changes, the application framework layer of the terminal system sends a notification message of the change of the telephone call state to the WeChat application. At this time, the filter acts as an interceptor, and a specific processing process may be as shown in FIG. 4:

In step 400, a notification message that the telephone call state changes is obtained.

For example, the notification message may be: receiving a telephone call, dialing a telephone call, ending a telephone call, etc.

In step 402, it is determined whether a function allowing coexistence of a telephone call and a VOIP call is enabled.

The user may preset on the terminal whether the function allowing coexistence of the telephone call and the VOIP call is enabled. For example, an option may be provided on a setting interface of the terminal for the user to select whether to enable the foregoing function.

In response to determining that the function to allow coexistence of a telephone call and a VOIP call is enabled, step 404a is performed.

In response to determining that the function to allow coexistence of a telephone call and a VOIP call is not enabled, step 404b is performed.

In step 404a, the notification message is intercepted.

When it is determined that the foregoing function is enabled, all the notification messages about change of the telephone call state sent to the WeChat application are intercepted, so as to avoid the problem in the related art that in response to determining the terminal receives a call request message initiated by the second peer device for establishing a telephone call, a notification message of the terminal receiving the call request message is sent to the WeChat application, so that the WeChat application terminates a current VOIP call. The coexistence of the VOIP call and the telephone call is implemented.

In step 404b, the notification message is sent to the WeChat.

According to the call processing method provided in the embodiments of the present disclosure, the filter may be used to selectively notify the WeChat based on different usage scenarios, so as to implement a purpose of coexistence of a VOIP call and a telephone call.

In an example, when the call state query request message sent by the WeChat application is received, no matter whether the operation system of the terminal monitors that the current terminal is engaged in a telephone call, a response message that the current terminal is not engaged in a telephone call is returned to the WeChat application through the filter, so that the WeChat application establishes a VOIP call based on the response message. After the WeChat application establishes the VOIP call, the notification message about change of the telephone call state sent to the WeChat application is filtered through the filter, so that after the terminal user answers the telephone call, the VOIP call may be kept in the background of the terminal, and the purpose of coexistence of the VOIP call and the telephone call is implemented.

In an optional example, in response to detecting that the telephone call is established with the second peer device, an audio signal of the telephone call is played, and mute processing on the audio signal of the VOIP call is performed.

Corresponding to the foregoing embodiments, when a telephone call is established in the case where the terminal is making a VOIP call, an operation system of the terminal may set the audio signal of the telephone call to be in a playing state, and set the audio signal of the VOIP call to be in a mute state.

The call processing method of the example may automatically set an audio signal of the telephone call to be in a playing state and set the audio signal of the VOIP call to be in a mute state after a user establishes the telephone call again in the case of making the VOIP call. It is unnecessary for the user to manually reallocate an audio resource, and the degree of intelligence is relatively high.

Figure 5:
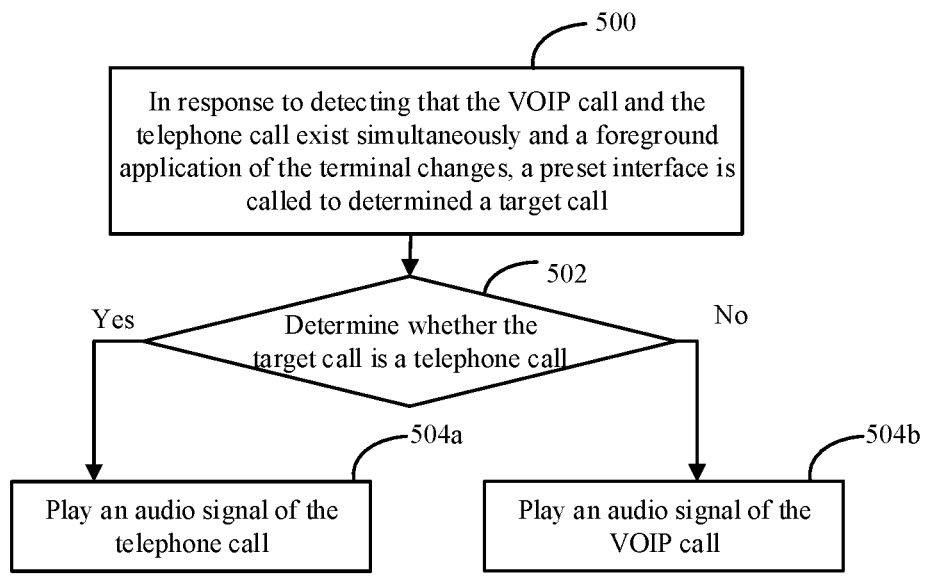
FIG. 5 is a flowchart of another call processing method according to an example of the present disclosure.

FIG. 5 is a flowchart of another call processing method according to an example of the present disclosure. In the description of this embodiment, the same steps as those in any one of the foregoing embodiments will be described briefly, and will not be described in detail. For details, reference may be made to any one of the foregoing embodiments. As shown in FIG. 5, the method in this example may include the following steps:

In step 500, in response to detecting that the VOIP call and the telephone call exist simultaneously and a foreground application of the terminal changes, a preset interface is called to determine a target call, where the target call is a call meeting a preset condition. The preset condition includes:
the application initiating the call runs in a foreground; or
a time point when the application initiating the call enters the background is closest to a current time point.

In response to determining an operation system of the terminal detects that the VOIP call and the telephone call exist simultaneously, and a specific interface monitors that a foreground application of the terminal changes, a preset interface may be called to determine the target call.

For example, the operation system of the terminal may determine the target call based on the name of the data packet returned by the preset interface. For example, when the package name obtained by the operation system of the terminal by calling the preset interface is com.android.mm, it can be determined that the target call is a VOIP call. When the package name obtained by the operation system of the terminal by calling the preset interface is com.android.phone, it can be determined that the target call is a telephone call.

When one of the VOIP call and the telephone call runs in a foreground of the terminal, the target call is a call running in the foreground of the terminal.

When both the VOIP call and the telephone call run in a background of the terminal, the target call is a call entering the background of the terminal later. For example, the operation system of the terminal may detect a time point when each application enters the background, and determine the target call based on the detected time point.

For example, the operation system of the terminal detects that the time point is 08:16:00, the time point when the WeChat application enters the background is 08:26:35, and a current time point is 08:26:36. The time point closest to the current time point is 8:26:35, and therefore, it can be determined that the VOIP call initiated by the WeChat application is the target call.

In step 502, it is determined whether the target call is a telephone call.

In response to determining it is determined whether the target call is a telephone call, step 504a is performed.

In response to determining it is determined whether the target call is not a telephone call, step 504b is performed.

In step 504a, an audio signal of the telephone call is played.

The audio signal of the telephone call may be set to be in a playing state, and the audio signal of the VOIP call may be set to be in a mute state.

In step 504b, an audio signal of the VOIP call is played.

The audio signal of the VOIP call may be set to be in a playing state, and the audio signal of the telephone call may be set to be in a mute state.

According to the call processing method provided in the embodiments of the present disclosure, a preset interface may be called to determine a target call running in the foreground of the terminal or entering the background of the terminal later, and automatically allocate an audio resource to the target call, so as to meet the usage requirements of the terminal user, implement the automatic allocation of the audio resource, and achieve a relatively high degree of intelligence.

Figure 6:
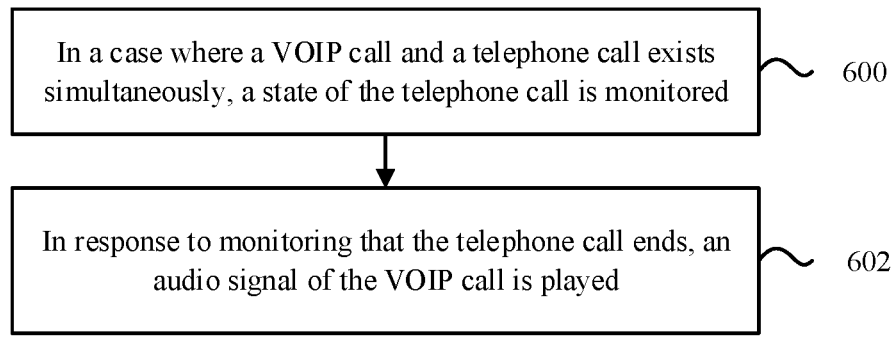
FIG. 6 is a flowchart of another call processing method according to an example of the present disclosure.

FIG. 6 is a flowchart of another call processing method according to an example of the present disclosure. As shown in FIG. 6, the method in this example may include the following steps:

In step 600, in a case where a VOIP call and a telephone call exists simultaneously, a state of the telephone call is monitored.

In step 602, in response to monitoring that the telephone call ends, an audio signal of the VOIP call is played.

As described above, the operation system of the terminal may monitor the state of the telephone call through a system interface. in response to determining it is monitored that the telephone call ends, an audio signal of the VOIP call may be automatically set to be in a playing state.

In an optional example, the operation system of the terminal may also monitor a state of the VOIP call, and in response to determining the operation system of the terminal monitors that the VOIP call ends, an audio signal of the telephone call may be automatically set to be in a playing state.

The call processing method of the example may play an audio signal of a call which is not ended when it is detected that one of the telephone call and the VOIP call ends. Automatic switching of the audio resource is implemented, and the degree of intelligence is relatively high.

It needs to be noted that for the sake of simple description, the above method embodiments are expressed as a series of action combinations, but those skilled in the art should be aware that the present disclosure is not limited by the described action sequence, because according to the present disclosure, some steps may be performed in other sequences or at the same time.

Next, those skilled in the art should also be aware that the embodiments described in the description are all preferred embodiments, and the actions and modules involved are not necessarily essential for the present disclosure.

Corresponding to the foregoing embodiments of the method for implementing an application function, the present disclosure further provides embodiments of an apparatus for implementing an application function and a corresponding terminal.

Figure 7:
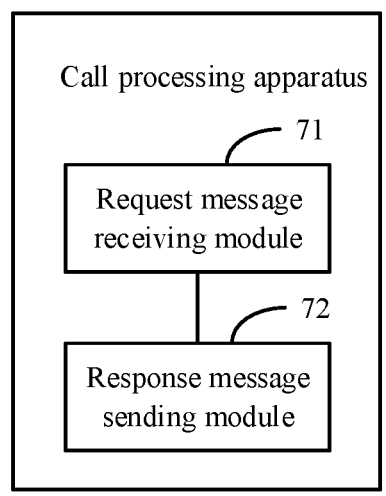
FIG. 7 is a schematic structural diagram of a call processing apparatus according to an example of the present disclosure.

FIG. 7 is a schematic structural diagram of a call processing apparatus according to an example of the present disclosure, and as shown in FIG. 7, the call processing apparatus may include:
- a request message receiving module 71, configured to receive, in response to determining a voice over Internet protocol (VOIP) call needs to be initiated by a first application on a terminal, a call state query request message sent by the first application. where the call state query request message is used to request querying whether the terminal is engaged in a telephone call.
- a response message sending module 72, configured to always send, to the first application, a response message used to indicate that the terminal is not engaged in a telephone call, so that the first application establishes the VOIP call with a first peer device based on the response message.

Figure 8:
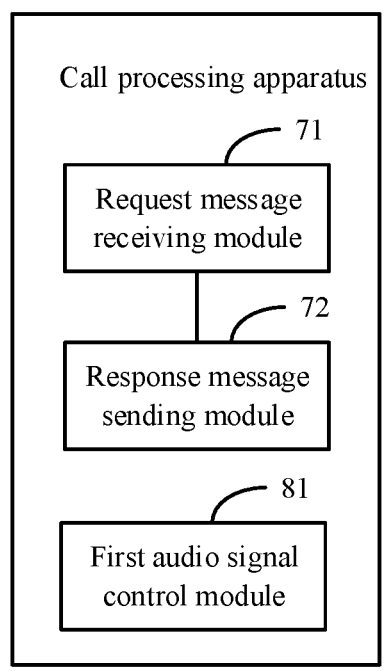
FIG. 8 is a schematic structural diagram of another call processing apparatus according to an example of the present disclosure.

Optionally, as shown in FIG. 8, based on the structure of the call processing apparatus shown in FIG. 7, the call processing apparatus may further include:
- a first audio signal control module 81, configured to play, in response to monitoring that the telephone call exists on the terminal after the VOIP call is established, an audio signal of the VOIP call, and perform mute processing on the audio signal of the telephone call.

Figure 9:
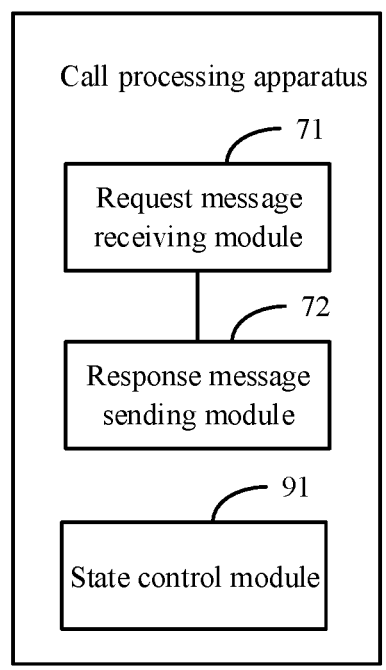
FIG. 9 is a schematic structural diagram of another call processing apparatus according to an example of the present disclosure.

Optionally, as shown in FIG. 9, based on the structure of the call processing apparatus shown in FIG. 7, the call processing apparatus may further include:
- a state control module 91, configured to not send, in response to receiving a call request message sent by a second peer device for requesting to establish a telephone call with the terminal, a notification message that the terminal receives the call request message to the first application, so that the first application maintains the VOIP call.

Figure 10:
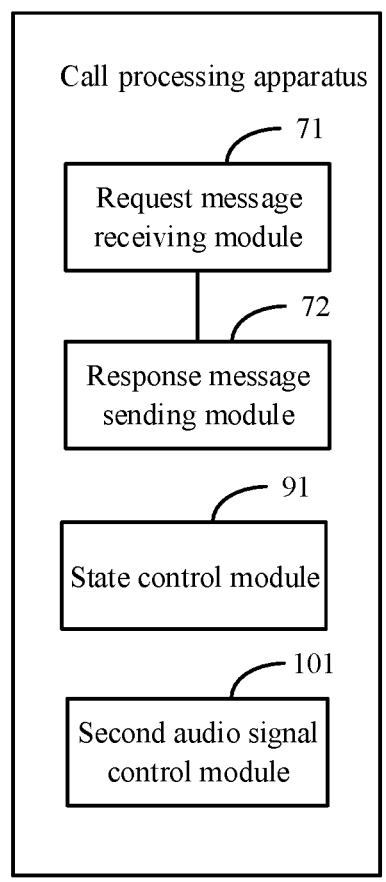
FIG. 10 is a schematic structural diagram of another call processing apparatus according to an example of the present disclosure.

Optionally, as shown in FIG. 10, based on the structure of the call processing apparatus shown in FIG. 9, the call processing apparatus may further include:
- a second audio signal control module 101, configured to play, in response to monitoring that the telephone call is established with the second peer device, an audio signal of the telephone call, and perform mute processing on the audio signal of the VOIP call.

Figure 11:
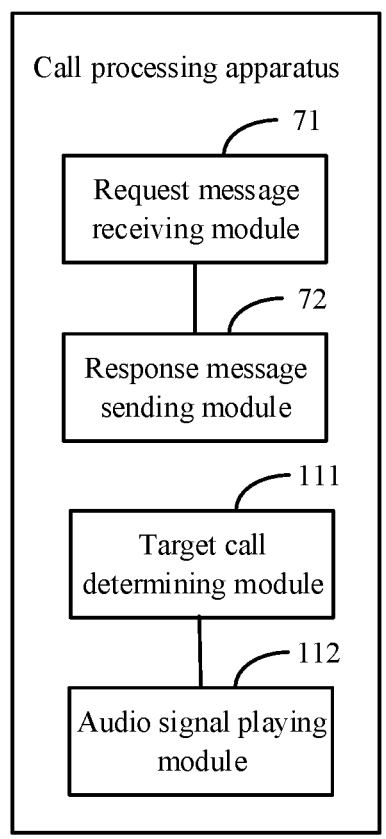
FIG. 11 is a schematic structural diagram of another call processing apparatus according to an example of the present disclosure.

Optionally, as shown in FIG. 11, based on the structure of the call processing apparatus shown in FIG. 7, the call processing apparatus may further include:
- a target call determining module 111, configured to determine, in the case where the VOIP call and the telephone call simultaneously exist, a target call meeting a preset condition in the VOIP call and the telephone call; and
- an audio signal playing module 112, configured to play an audio signal of the target call.

Figure 12:
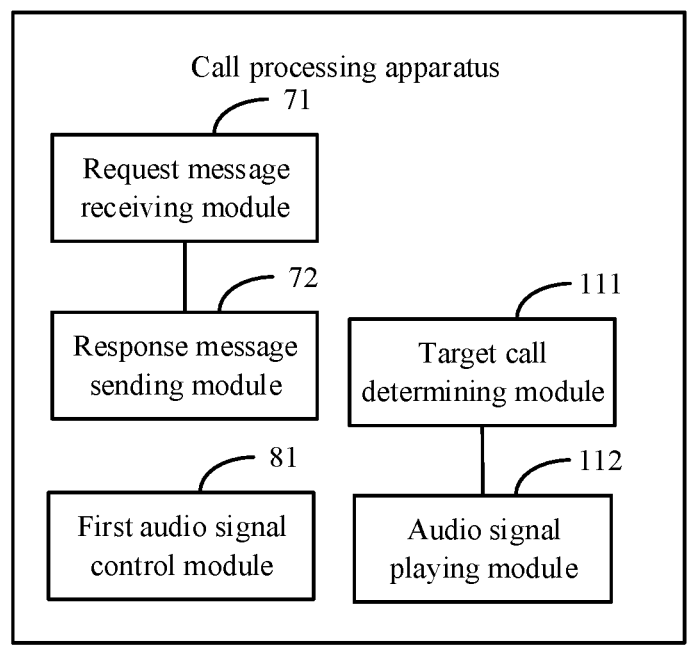
FIG. 12 is a schematic structural diagram of another call processing apparatus according to an example of the present disclosure.

Optionally, as shown in FIG. 12, based on the structure of the call processing apparatus shown in FIG. 8, the call processing apparatus may further include:
- a target call determining module 111, configured to determine, in response to determining that the VOIP call and the telephone call simultaneously exist, a target call meeting a preset condition in the VOIP call and the telephone call; and
- an audio signal playing module 112, configured to play an audio signal of the target call.

Figure 13:
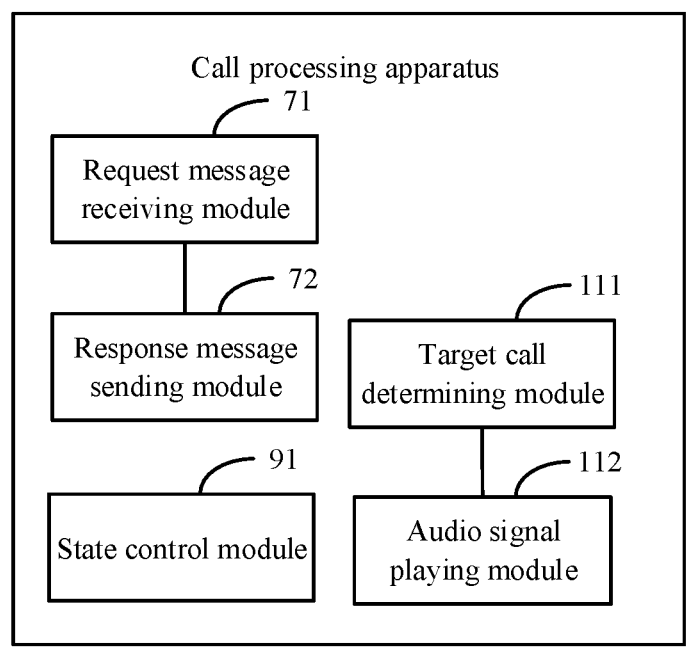
FIG. 13 is a schematic structural diagram of another call processing apparatus according to an example of the present disclosure.

Optionally, as shown in FIG. 13, based on the structure of the call processing apparatus shown in FIG. 9, the call processing apparatus may further include:
- a target call determining module 111, configured to determine, in the case where the VOIP call and the telephone call simultaneously exist, a target call meeting a preset condition in the VOIP call and the telephone call; and
- an audio signal playing module 112, configured to play an audio signal of the target call.

Figure 14:
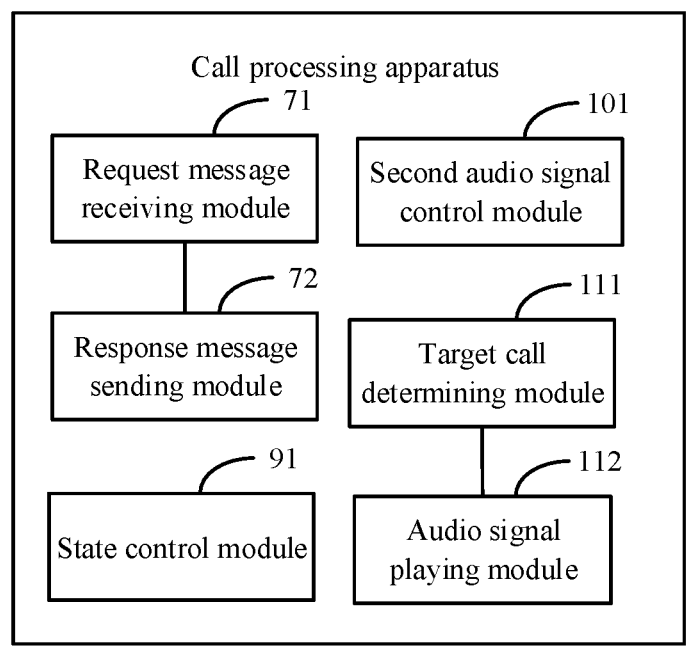
FIG. 14 is a schematic structural diagram of another call processing apparatus according to an example of the present disclosure.

Optionally, as shown in FIG. 14, based on the structure of the call processing apparatus shown in FIG. 10, the call processing apparatus may further include:
- a target call determining module 111, configured to determine, in the case where the VOIP call and the telephone call simultaneously exist, a target call meeting a preset condition in the VOIP call and the telephone call; and
- an audio signal playing module 112, configured to play an audio signal of the target call.

Optionally, the preset condition includes:
the application initiating the call runs in a foreground; or
a time point when the application initiating the call enters the background is closest to a current time point.

Figure 15:
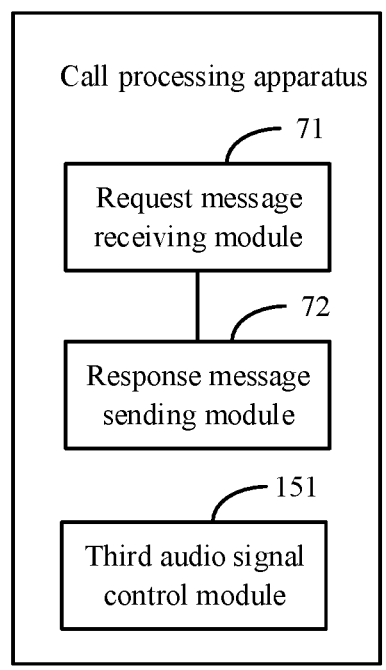
FIG. 15 is a schematic structural diagram of another call processing apparatus according to an example of the present disclosure.

Optionally, as shown in FIG. 15, based on the structure of the call processing apparatus shown in FIG. 7, the call processing apparatus may further include:
- a third audio signal control module 151, configured to play, in response to detecting that one of the telephone call and the VOIP call ends, an audio signal of a call which is not ended.

Figure 16:
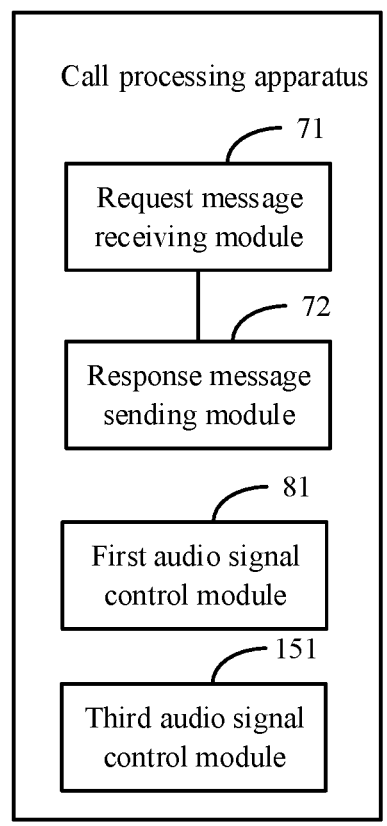
FIG. 16 is a schematic structural diagram of another call processing apparatus according to an example of the present disclosure.

Optionally, as shown in FIG. 16, based on the structure of the call processing apparatus shown in FIG. 8, the call processing apparatus may further include:
- a third audio signal control module 151, configured to play, in response to detecting that one of the telephone call and the VOIP call ends, an audio signal of a call which is not ended.

Figure 17:
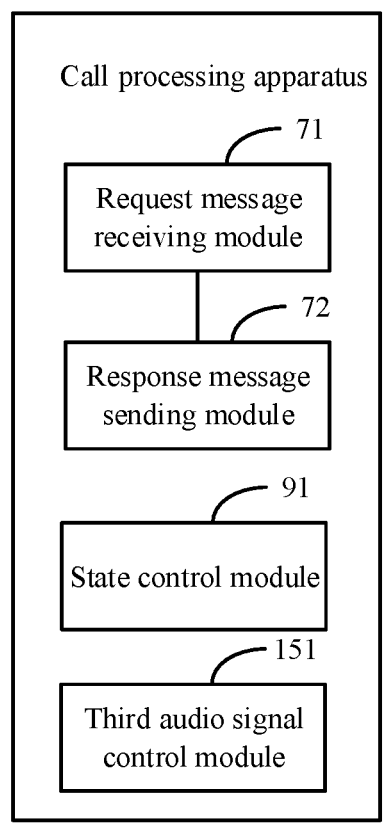
FIG. 17 is a schematic structural diagram of another call processing apparatus according to an example of the present disclosure.

Optionally, as shown in FIG. 17, based on the structure of the call processing apparatus shown in FIG. 9, the call processing apparatus may further include:
- a third audio signal control module 151, configured to play, in response to detecting that one of the telephone call and the VOIP call ends, an audio signal of a call which is not ended.

Figure 18:
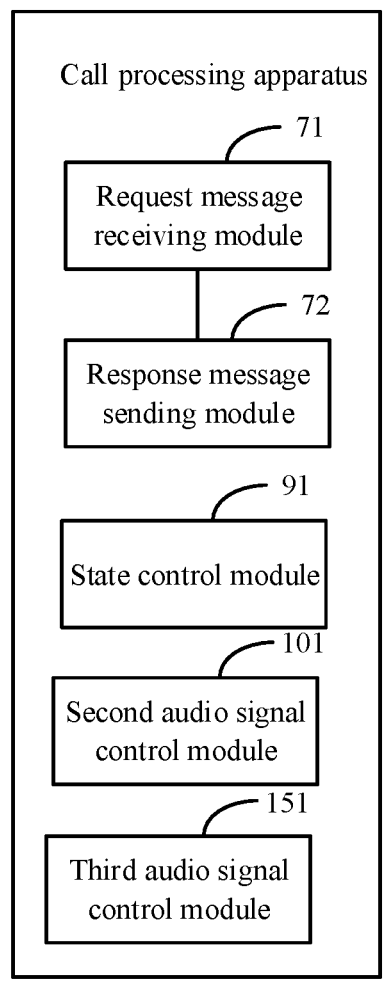
FIG. 18 is a schematic structural diagram of another call processing apparatus according to an example of the present disclosure.

Optionally, as shown in FIG. 18, based on the structure of the call processing apparatus shown in FIG. 10, the call processing apparatus may further include:

a third audio signal control module 151, configured to play, in response to detecting that one of the telephone call and the VOIP call ends, an audio signal of a call which is not ended.

The apparatus embodiments substantially correspond to the method embodiments, so reference may be made to the descriptions of the method embodiments. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present disclosure. Those of ordinary skill in the art can understand and implement without any creative effort.

Correspondingly, the embodiment of the present disclosure provides an electronic device, including: a processor; and a memory for storing processor executable instructions, where the processor is configured to execute the call processing method of any one of the embodiments of the present disclosure.

Figure 19:
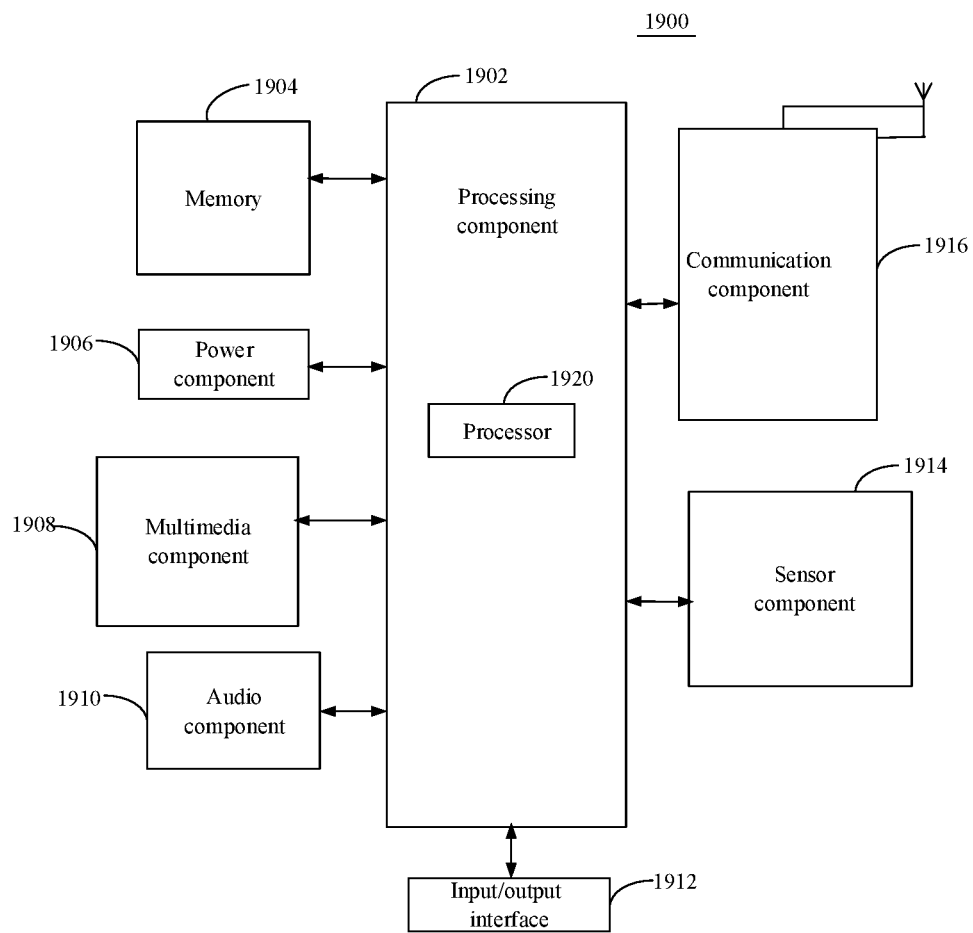
FIG. 19 is a schematic structural diagram of an electronic device according to an example of the present disclosure.

FIG. 19 is a schematic structural diagram of an electronic device 1900 according to an example of the present disclosure. For example, the electronic device 1900 may be user equipment, and may specifically be a mobile phone, a tablet device, and a wearable device such as a smart watch, a smart bracelet, etc.

Referring to FIG. 19, the electronic device 1900 may include one or more of the following components: a processing component 1902, a memory 1904, a power component 1906, a multimedia component 1908, an audio component 1910, an input/output (I/O) interface 1912, a sensor component 1914, and a communication component 1916.

The processing component 1902 generally controls the overall operations of the electronic device 1900, such as operations associated with display, telephone calls, data communications, camera operations and recording operations. The processing component 1902 may include one or more processors 1920 to execute instructions to complete all of or part of the steps of the above method. In addition, the processing component 1902 may include one or more modules to facilitate the interaction between the processing component 1902 and other components. For example, the processing component 1902 may include a multimedia module to facilitate interaction between the multimedia component 1908 and the processing component 1902.

The memory 1904 is configured to store various types of data to support the operations at the device 1900. Examples of these data include instructions for any application or method operated on the electronic device 1900, contact data, phone book data, messages, pictures, videos, etc. The memory 1904 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1906 provides power to various components of the electronic device 1900. The power component 1906 may include a power management system, one or more power supplies, and other components associated with the generation, management, and distribution of power for the electronic device 1900.

The multimedia component 1908 includes a screen that provides an output interface between the electronic device 1900 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The above touch sensor may sense not only the boundary of a touch or slide, but also the duration and pressure associated with the touch or slide. In some embodiments, the multimedia component 1908 includes a front camera and/or a rear camera. When the device 1900 is in an operation mode, such as a shooting mode or a video mode, the front camera and/or the rear camera may receive external multimedia data. Each front or rear camera may be a fixed optical lens system or have a focal length and optical zoom capability.

The audio component 1910 is configured to output and/or input an audio signal. For example, the audio component 1910 includes a microphone (MIC), which is configured to receive external audio signals when the electronic device 1900 is in an operation mode, such as a call mode, a recording mode and a voice recognition mode. The received audio signals may be further stored in the memory 1904 or sent by the communication component 1916. In some embodiments, the audio component 1910 further includes a speaker for outputting audio signals.

The I/O interface 1912 provides an interface between the processing component 1902 and a peripheral interface module. The peripheral interface module may be a keyboard, a click wheel, buttons, etc. These buttons may include, but are not limited to a home button, a volume button, a start button, and a lock button.

The sensor component 1914 includes one or more sensors for providing various aspects of status assessment for the electronic device 1900. For example, the sensor component 1914 may detect the on/off states of the device 1900, and a relative positioning of components, for example, the components are the display and keypad of the electronic device 1900. The sensor component 1914 may further detect a change of position of the electronic device 1900 or one component of the electronic device 1900, whether or not the user touches the electronic device 1900, a location or acceleration/deceleration of the electronic device 1900, and a temperature variation of the electronic device 1900. The sensor component 1914 may include a proximity sensor configured to detect the presence of nearby objects without any physical contact. The sensor component 1914 may further include an optical sensor, such as a CMOS or CCD image sensor, for use in imaging applications. In some embodiments, the sensor component 1914 may further include an acceleration sensor, a gyroscope sensor, a magnetic sensor, a pressure sensor or a temperature sensor.

The communication component 1916 is configured to facilitate wired or wireless communication between the electronic device 1900 and other devices. The electronic device 1900 may access wireless networks based on communication standards, such as WiFi, 4G or 5G, 4G LTE, 5G NR, or a combination thereof. In an example, the communication component 1916 receives broadcast signals or broadcast associated information from an external broadcast management system via a broadcast channel. In an example, the communication component 1916 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 1900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to perform the above method.

In an example, a non-transitory computer-readable storage medium including instructions is further provided, such as a memory 1904 including instructions, when the instructions in the storage medium is executed by the processor 1920 of the electronic device 1900, the electronic device 1900 is enabled to perform the call processing method, and the method includes:

when a voice over Internet protocol (VOIP) call needs to be initiated through a first application on a terminal, receiving a call state query request message sent by the first application, where the call state query request message is used to request querying whether the terminal is engaged in a telephone call; and always sending, to the first application, a response message used to indicate that the terminal is not engaged in a telephone call, so that the first application establishes the VOIP call with a first peer device based on the response message.

For example, the non-transitory computer-readable storage medium may be an ROM, a random access memory (RAM), a CD-ROM, a magnetic tape, a floppy disk, an optical data storage device, etc.

A person skilled in the art would readily conceive of other examples of the present disclosure after considering the specification and practicing the invention disclosed herein. The present disclosure is intended to cover any variations, uses or adaptive changes of the present disclosure. These variations, uses or adaptive changes follow the general principle of the present disclosure and include common general knowledge or conventional technical means in the technical field that are not disclosed in the present disclosure. The description and the embodiments are merely regarded as exemplary, and the real scope and spirit of the present disclosure are pointed out by the following claims.

It should be understood that the present disclosure is not limited to the precise structure described above and shown in the drawings, and various modifications and changes can be made without departing from its scope. The scope of the present disclosure is only limited by the appended claims.

In view of this, the embodiments of the present disclosure provide a call processing method and apparatus, a storage medium, and an electronic device.

According to a first aspect of the present disclosure, there is provided a call processing method, including:

receiving, in response to determining a voice over Internet protocol (VOIP) call needs to be initiated through a first application on a terminal, a call state query request message sent by the first application, wherein the call state query request message is used to request querying whether the terminal is engaged in a telephone call; and always sending, to the first application, a response message used to indicate that the terminal is not engaged in a telephone call, so that the first application establishes the VOIP call with a first peer device based on the response message.

With reference to any implementation provided in the present disclosure, the method further includes:

playing, in response to monitoring that the telephone call exists on the terminal after the VOIP call is established, an audio signal of the VOIP call, and performing mute processing on the audio signal of the telephone call.

With reference to any implementation provided in the present disclosure, before the VOIP call is not ended, the method further includes:

not sending, in response to receiving a call request message sent by a second peer device for requesting to establish a telephone call with the terminal, a notification message that the terminal receives the call request message to the first application, so that the first application maintains the VOIP call.

With reference to any implementation provided in the present disclosure, the method further includes:

playing, in response to monitoring that the telephone call is established with the second peer device, an audio signal of the telephone call, and performing mute processing on the audio signal of the VOIP call.

With reference to any implementation provided in the present disclosure, the method further includes:

determining, in response to determining that the VOIP call and the telephone call simultaneously exist, a target call meeting a preset condition in the VOIP call and the telephone call; and playing an audio signal of the target call.

With reference to any implementation provided in the present disclosure, the preset condition includes:

the application initiating the call runs in a foreground; or a time point when the application initiating the call enters the background is closest to a current time point.

With reference to any implementation provided in the present disclosure, the method further includes:

playing, in response to detecting that one of the telephone call and the VOIP call ends, an audio signal of a call which is not ended.

According to a second aspect of the present disclosure, there is provided a call processing apparatus, including:

a request message receiving module, configured to receive, in response to determining a voice over Internet protocol (VOIP) call needs to be initiated through a first application on a terminal, a call state query request message sent by the first application, wherein the call state query request message is used to request querying whether the terminal is engaged in a telephone call; and a response message sending module, configured to always send, to the first application, a response message used to indicate that the terminal is not engaged in a telephone call, so that the first application establishes the VOIP call with a first peer device based on the response message.

According to a third aspect of the present disclosure, there is provided a non-transitory computer-readable storage medium, storing machine-readable instructions thereon, and when the machine-readable instructions are called and executed by a processor, the processor is promoted to implement the call processing method of any one of the embodiments of the present disclosure.

According to a fourth aspect of the present disclosure, there is provided an electronic device, including:

a processor; and a memory for storing processor executable instruction, where the processor is configured to perform the call processing method of any one of the embodiments of the present disclosure.

The technical solutions provided by the embodiments of the present disclosure may include the following beneficial effects.

The embodiments of the present disclosure provide a call processing method and apparatus, a storage medium, and an electronic device. In response to determining a voice over Internet protocol (VOIP) call needs to be initiated through a first application on a terminal, a call state query request message sent by the first application is received, where the call state query request message is used to request querying whether the terminal is engaged in a telephone call, always sending, to the first application, a response message used to indicate that the terminal is not engaged in a telephone call, so that the first application establishes the VOIP call with a first peer device based on the response message. According to the call processing method provided in the embodiment of the present disclosure, after a call is answered, a VOIP call may be normally answered or dialed, so that coexistence of the telephone call and the VOIP call is implemented.

The invention claimed is:

1. A call processing method, wherein the call processing method is performed by a terminal, and the call processing method comprises:
receiving, in response to determining a voice over Internet protocol (VOIP) call needs to be initiated through a first application on the terminal, a call state query request message sent by the first application, wherein the call state query request message is used to request querying whether the terminal is engaged in a telephone call; and
always sending, to the first application, a response message used to indicate that the terminal is not engaged in the telephone call, so that the first application establishes the VOIP call with a first peer device based on the response message;
wherein always sending, to the first application, the response message used to indicate that the terminal is not engaged in the telephone call comprises:
returning, in response to determining that a function allowing coexistence of the telephone call and the VOIP call is enabled, the response message that the terminal is not engaged in the telephone call to the first application, regardless as to whether current monitoring indicates that the terminal is engaged in the telephone call.

2. The call processing method according to claim 1, wherein the call processing method further comprises:
playing, in response to monitoring that the telephone call exists on the terminal after the VOIP call is established, an audio signal of the VOIP call, and performing mute processing on the audio signal of the telephone call.

3. The call processing method according to claim 1, wherein before the VOIP call is not ended, the call processing method further comprises:
not sending, in response to receiving a call request message sent by a second peer device for requesting to establish a telephone call with the terminal, a notification message that the terminal receives the call request message to the first application, so that the first application maintains the VOIP call.

4. The call processing method according to claim 3, wherein the call processing method further comprises:
playing, in response to monitoring that the telephone call is established with the second peer device, an audio signal of the telephone call, and performing mute processing on the audio signal of the VOIP call.

5. The call processing method according to claim 1, wherein the call processing method further comprises:
determining, in response to determining that the VOIP call and the telephone call simultaneously exist, a target call meeting a preset condition in the VOIP call and the telephone call; and
playing an audio signal of the target call.

6. The call processing method according to claim 5, wherein the preset condition comprises:
the application initiating the call runs in a foreground; or
a time point when the application initiating the call enters a background is closest to a current time point.

7. The call processing method according to claim 1, wherein the call processing method further comprises:
playing, in response to detecting that one of the telephone call and the VOIP call ends, an audio signal of a call which is not ended.

8. A non-transitory computer-readable storage medium storing a computer program, wherein the computer program, when executed by one or more processors, causes the one or more processors to perform a method comprising:
receiving, in response to determining a voice over Internet protocol (VOIP) call needs to be initiated through a first application on a terminal, a call state query request message sent by the first application, wherein the call state query request message is used to request querying whether the terminal is engaged in a telephone call;
always sending, to the first application, a response message used to indicate that the terminal is not engaged in the telephone call, so that the first application establishes the VOIP call with a first peer device based on the response message; and
returning, in response to determining that a function allowing coexistence of the telephone call and the VOIP call is enabled, the response message that the terminal is not engaged in the telephone call to the first application, regardless as to whether current monitoring indicates that the terminal is engaged in the telephone call.

9. The non-transitory computer-readable storage medium according to claim 8, wherein the method further includes:
playing, in response to monitoring that the telephone call exists on the terminal after the VOIP call is established, an audio signal of the VOIP call, and performing mute processing on the audio signal of the telephone call.

10. The non-transitory computer-readable storage medium according to claim 8, wherein the method further includes:
not sending, in response to receiving a call request message sent by a second peer device for requesting to establish a telephone call with the terminal, a notification message that the terminal receives the call request message to the first application, so that the first application maintains the VOIP call.

11. The non-transitory computer-readable storage medium according to claim 10, wherein the method further includes:
playing, in response to monitoring that the telephone call is established with the second peer device, an audio signal of the telephone call, and performing mute processing on the audio signal of the VOIP call.

12. The non-transitory computer-readable storage medium according to claim 8, wherein the method further includes:

determining, in response to determining that the VOIP call and the telephone call simultaneously exist, a target call meeting a preset condition in the VOIP call and the telephone call; and playing an audio signal of the target call.

13. The non-transitory computer-readable storage medium according to claim 8, wherein the method further includes:

playing, in response to detecting that one of the telephone call and the VOIP call ends, an audio signal of a call which is not ended.

14. An electronic device, comprising:

one or more processors; and a memory configured to store processor executable instructions, wherein the one or more processors, when executing the processor executable instructions, are collectively configured to:

receive, in response to determining a voice over Internet protocol (VOIP) call needs to be initiated through a first application on a terminal, a call state query request message sent by the first application, wherein the call state query request message is used to request querying whether the terminal is engaged in a telephone call;

always send, to the first application, a response message used to indicate that the terminal is not engaged in the telephone call, so that the first application establishes the VOIP call with a first peer device based on the response message; and return, in response to determining that a function allowing coexistence of the telephone call and the VOIP call is enabled, the response message that the terminal is not engaged in the telephone call to the first application, regardless as to whether current monitoring indicates that the terminal is engaged in the telephone call.

15. The electronic device according to claim 14, wherein the one or more processors are further collectively configured to:

play, in response to monitoring that the telephone call exists on the terminal after the VOIP call is established, an audio signal of the VOIP call, and perform mute processing on the audio signal of the telephone call.

16. The electronic device according to claim 14, wherein the one or more processors are further collectively configured to:

not send, in response to receiving a call request message sent by a second peer device for requesting to establish a telephone call with the terminal, a notification message that the terminal receives the call request message to the first application, so that the first application maintains the VOIP call.

17. The electronic device according to claim 16, wherein the one or more processors are further collectively configured to:

play, in response to monitoring that the telephone call is established with the second peer device, an audio signal of the telephone call, and perform mute processing on the audio signal of the VOIP call.

18. The electronic device according to claim 14, wherein the one or more processors are further collectively configured to:

determine, in response to determining that the VOIP call and the telephone call simultaneously exist, a target call meeting a preset condition in the VOIP call and the telephone call; and play an audio signal of the target call.

19. The electronic device according to claim 18, wherein the preset condition comprises:

the application initiating the call runs in a foreground; or a time point when the application initiating the call enters a background is closest to a current time point.

20. The electronic device according to claim 14, wherein the one or more processors are further collectively configured to:

play, in response to detecting that one of the telephone call and the VOIP call ends, an audio signal of a call which is not ended.

\* \* \* \* \*

UNITED STATES PATENT AND TRADEMARK OFFICE
CERTIFICATE OF CORRECTION

| | | |
|---|---|---|
| PATENT NO. | : 12,457,253 B2 | Page 1 of 1 |
| APPLICATION NO. | : 18/068321 | |
| DATED | : October 28, 2025 | |
| INVENTOR(S) | : Shilong Pei | |

It is certified that error appears in the above-identified patent and that said Letters Patent is hereby corrected as shown below:

On the Title Page

Item (54) and in the Specification, Column 1, Lines 1-3, Correct the title from "CALL PROCESSING METHOD AND APPARATUS, STORAGE MEDIUM, AND ELECTRONIC" to "CALL PROCESSING METHOD AND APPARATUS, STORAGE MEDIUM, AND ELECTRONIC DEVICE"

Signed and Sealed this
Twenty-third Day of December, 2025

John A. Squires
*Director of the United States Patent and Trademark Office*